US012052238B2

(12) United States Patent
D'Agostino et al.

(10) Patent No.: US 12,052,238 B2
(45) Date of Patent: *Jul. 30, 2024

(54) SYSTEM AND METHOD FOR ESTABLISHING SECURE COMMUNICATION BETWEEN APPLICATIONS

(71) Applicant: The Toronto-Dominion Bank, Toronto (CA)

(72) Inventors: Dino Paul D'Agostino, Richmond Hill (CA); David Samuel Tax, Toronto (CA); Milos Dunjic, Oakville (CA); Sahana Dorai, Hamilton (CA); Nolan Glynn-Udrow, Mississauga (CA)

(73) Assignee: The Toronto-Dominion Bank, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,385

(22) Filed: Jun. 22, 2023

(65) Prior Publication Data

US 2023/0336545 A1    Oct. 19, 2023

Related U.S. Application Data

(63) Continuation of application No. 17/206,694, filed on Mar. 19, 2021, now Pat. No. 11,729,163.

(51) Int. Cl.
*H04L 9/40* (2022.01)
(52) U.S. Cl.
CPC ...... *H04L 63/0853* (2013.01); *H04L 63/0245* (2013.01); *H04L 63/0435* (2013.01); *H04L 63/0876* (2013.01)

(58) Field of Classification Search
CPC ............ H04L 63/126; H04L 63/0428; H04L 63/0245; H04L 63/0435; H04L 63/0853; H04L 63/0876; H04W 12/03; H04W 12/108
USPC ............................................. 726/4
See application file for complete search history.

(56) References Cited

U.S. PATENT DOCUMENTS

| | | | |
|---|---|---|---|
| 8,544,068 B2 | 9/2013 | Yates et al. | |
| 9,191,813 B2 | 11/2015 | Lim et al. | |
| 10,243,958 B2 | 3/2019 | Chandoor et al. | |
| 10,387,873 B2 | 8/2019 | Kuhn et al. | |

(Continued)

FOREIGN PATENT DOCUMENTS

| | | |
|---|---|---|
| CN | 108228370 | 6/2018 |
| CN | 107920060 | 6/2020 |

*Primary Examiner* — Badri Narayanan Champakesan
(74) *Attorney, Agent, or Firm* — Rowand LLP

(57) ABSTRACT

A computer-implemented method is disclosed. The method includes: receiving, via a first application, a request to connect a first data record associated with the first application on a computing device with a second data record associated with a second application on the computing device; establishing a secure data communication channel between the first application and the second application; receiving, via the first application, a request for transfer of data between the first application and the second application; and in response to receiving the request, transmit, by the first application to the second application via the secure data communication channel, a message comprising the second device token using a trusted link associated with the second application.

16 Claims, 8 Drawing Sheets

(56) References Cited

U.S. PATENT DOCUMENTS

| | | | |
|---|---|---|---|
| 10,469,484 B1 | 11/2019 | Chen et al. | |
| 10,530,761 B2 | 1/2020 | Hockey et al. | |
| 10,595,192 B2 | 3/2020 | Ward et al. | |
| 11,489,842 B1* | 11/2022 | Russell | G06Q 20/40 |
| 2007/0027804 A1* | 2/2007 | Vega | G06Q 20/401 |
| | | | 705/39 |
| 2014/0012751 A1* | 1/2014 | Kuhn | G06Q 20/367 |
| | | | 705/41 |
| 2014/0304780 A1* | 10/2014 | Kuang | H04L 63/06 |
| | | | 726/4 |
| 2014/0317637 A1 | 10/2014 | Gadotti | |
| 2017/0201520 A1* | 7/2017 | Chandoor | H04W 12/35 |
| 2022/0078176 A1* | 3/2022 | Adda | H04L 9/083 |

* cited by examiner

SYSTEM AND METHOD FOR ESTABLISHING SECURE COMMUNICATION BETWEEN APPLICATIONS

CROSS-REFERENCE TO RELATED APPLICATIONS

This application is a continuation of U.S. patent application Ser. No. 17/206,694, filed on Mar. 19, 2021, the entire contents of which are incorporated herein by reference.

TECHNICAL FIELD

The present disclosure relates to data communication and, in particular, to systems and methods for facilitating secure communication between applications on a computing device.

BACKGROUND

Applications on a computing device are typically configured to communicate with each other. For example, applications may exchange user data, provide commands for invoking functions implemented by other applications, and cooperatively execute user-requested operations, among others. Communications between applications may comprise private or sensitive information, such as user account data. It is desirable to provide mechanisms for establishing secure communication between applications on a computing device.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
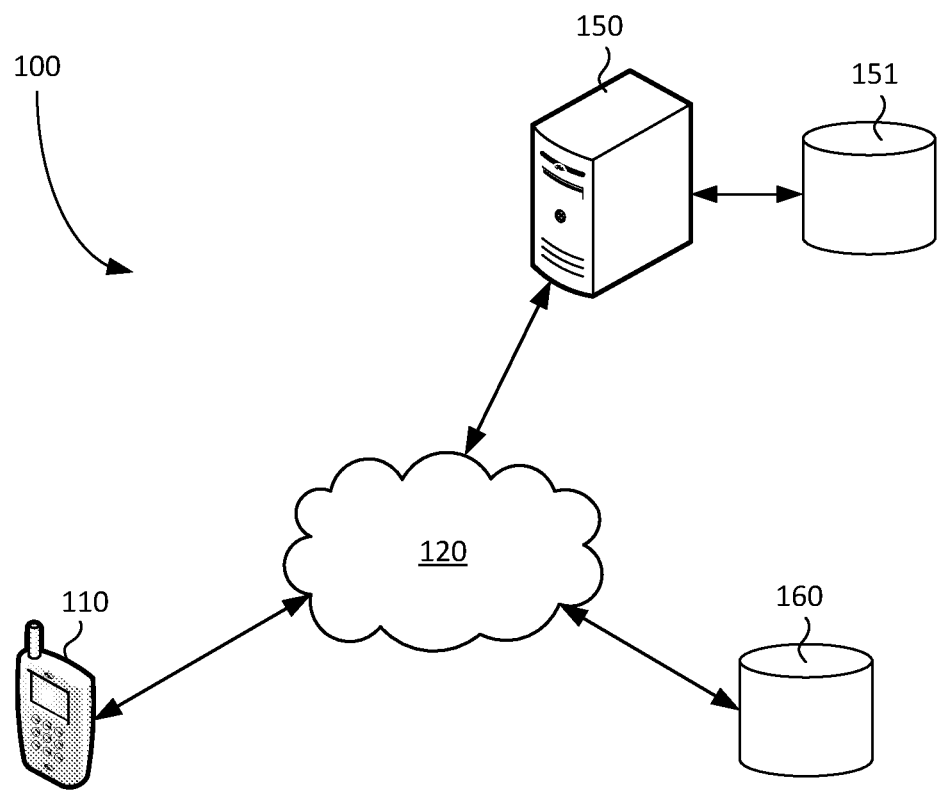
FIG. 1 is a schematic diagram illustrating an operating environment of an example embodiment.

In an aspect, the present disclosure describes a computing device. The computing device includes a processor and a memory coupled to the processor. The memory stores processor-executable instructions that, when executed by the processor, are to cause the processor to: receive, via a first application, a request to connect a first data record associated with the first application on the computing device with a second data record associated with a second application on the computing device; establish a secure data communication channel between the first application and the second application, wherein establishing the secure data communication channel comprises: sending, by the first application to the second application, identifying information for the first data record and a first device token associated with the first application; receiving, by the first application from the second application, a second device token associated with the second application; and causing the second device token to be stored, in the memory, in association with the first application; receive, via the first application, a request for transfer of data between the first application and the second application; and in response to receiving the request, transmit, by the first application to the second application via the secure data communication channel, a message comprising the second device token using a trusted link associated with the second application.

In some implementations, the sending to the second application may include: retrieving, from a data store, the trusted link associated with the second application; and sending, to the second application, the identifying information for the first data record and the first device token using the trusted link.

In some implementations, the first device token may comprise a unique signature associated with the first application.

In some implementations, the instructions, when executed, may further cause the processor to cause the first device token to be stored, in the memory, in association with the second application.

In some implementations, the instructions, when executed, may further cause the processor to: receive a request to add or update a value transfer card for use with the second application; and in response to receiving the request to add or update the value transfer card, send, to the second application via the secure data communication channel, card data of the value transfer card.

In some implementations, a message payload of the message may contain the second device token, an indication of an event type, and a representation of the value transfer card.

In some implementations, the message payload of the message may be encrypted.

In some implementations, the trusted link may be associated with one or more permitted operations and the instructions, when executed, may further cause the processor to determine whether transmitted data s covered by the one or more permitted operations.

In some implementations, the instructions, when executed, may further cause the processor to: receive a request to retrieve first data from the second application; and in response to receiving the request to retrieve the first data from the second application, transmit, by the first application to the second application via the secure data communication channel, a data retrieval request message.

In some implementations, the instructions, when executed, may further cause the processor to receive, from the second application via the secure data communication channel, a reply message containing at least the requested first data.

In another aspect, the present disclosure describes a processor-implemented method. The method includes: receiving, via a first application, a request to connect a first data record associated with the first application on a computing device with a second data record associated with a second application on the computing device; establishing a secure data communication channel between the first application and the second application, wherein establishing the secure data communication channel comprises: sending, by the first application to the second application, identifying information for the first data record and a first device token associated with the first application; receiving, by the first application from the second application, a second device token associated with the second application; and causing the second device token to be stored, in the memory, in association with the first application; receiving, via the first application, a request for transfer of data between the first application and the second application; and in response to receiving the request, transmit, by the first application to the second application via the secure data communication channel, a message comprising the second device token using a trusted link associated with the second application.

In another aspect, the present disclosure describes a computing device. The computing device includes a processor, a communications module coupled to the processor, and a memory coupled to the processor. The memory stores instructions that, when executed by the processor, configure the processor to: receive a request to connect a first data record associated with a first application on the computing device with a second data record associated with a second application on the computing device; and establish a secure communication channel between the first application and the second application, the secure communication channel enabling transmission of data between the first application and the second application, wherein establishing the secure communication channel comprises: sending, to the second application, identifying information for the first data record and a first device token associated with the first application; receiving, from the second application, a second device token associated with the second application; and cause the second device token to be stored, in the memory, in association with the first application.

In some implementations, the sending to the second application may include: retrieving, from a data store, a trusted link associated with the second application; and sending, to the second application, the identifying information for the first data record and the first device token using the trusted link.

In some implementations, the first device token may include a unique signature associated with the first application.

In some implementations, the instructions, when executed, may further configure the processor to: cause the first device token to be stored, in the memory, in association with the second application.

In some implementations, the instructions, when executed, may further configure the processor to: receive a request to add a value transfer card for use with the second application; and in response to receiving the request to add the value transfer card, send, to the second application via the secure communication channel, card data of the value transfer card.

In some implementations, sending the card data of the value transfer card may include transmitting, via an operating system (OS)-level notification service, a message to the second application, and a message payload of the message may contain a device token for the second application, an indication of an event type, and a representation of the value transfer card.

In some implementations, the message payload of the message may be encrypted.

In some implementations, sending the card data of the value transfer card may include transmitting, using a trusted link associated with the second application, a message to the second application and a message payload of the message may contain a device token for the second application, an indication of an event type, and the value transfer card.

In some implementations, the instructions, when executed, may further configure the processor to: receive a request to retrieve first data from the second application; and in response to receiving the request to retrieve the first data from the second application, send, to the second application via the secure communication channel, a data retrieval request message.

In some implementations, the instructions, when executed, may further configure the processor to receive, from the second application via the secure communication channel, a reply message containing at least the requested first data.

In another aspect, the present disclosure describes a computer-implemented method. The method includes: receiving a request to connect a first data record associated with a first application on a computing device with a second data record associated with a second application on the computing device; and establishing a secure communication channel between the first application and the second application, the secure communication channel enabling transmission of data between the first application and the second application, wherein establishing the secure communication channel comprises: sending, to the second application, identifying information for the first data record and a first device token associated with the first application; receiving, from the second application, a second device token associated with the second application; and causing the second device token to be stored, in the memory, in association with the first application.

In another aspect, a non-transitory computer readable storage medium is disclosed. The computer readable storage medium contains instructions thereon which, when executed by a processor, configure the processor to: receive a request to connect a first data record associated with a first application on a computing device with a second data record associated with a second application on the computing device; and establish a secure communication channel between the first application and the second application, the secure communication channel enabling transmission of data between the first application and the second application, wherein establishing the secure communication channel comprises: sending, to the second application, identifying information for the first data record and a first device token associated with the first application; receiving, from the second application, a second device token associated with the second application; and cause the second device token to be stored, in the memory, in association with the first application.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "application" refers broadly to software that is resident on a computing device and may include, for example, third-party applications, native applications, and web applications. An application may be software that is installed and run locally on a computing device, or software that is run on a web server and accessed, for example, using a web browser on a computing device.

Communications between applications on a computing device may comprise private or sensitive information. Accordingly, applications may require permissions to engage in certain types of inter-application communication. For example, a target application requesting to receive highly sensitive user data from a source application may require permissions which may be granted by the source application and/or a user of the computing device. Furthermore, various restrictions may be defined in connection with inter-application communication. For example, restrictions may be imposed on the content (e.g., exchanged data) or parameters of communication between certain applications. The permissions and restrictions relating to inter-application communication are often hard-coded within the applications. If changes are desired to be made to how applications communicate or link to each other, significant programming efforts may be required, making the changes costly or prohibitive to implement.

Applications may be associated with user accounts. The features and functions of an application may be customized for a particular user (e.g., user of the computing device) based on account data for a user account that is associated with the application. In some instances, it may be desirable to link accounts of a user that are associated with different applications. Such linking of user accounts may allow the user to access, within a single application, data and functionalities relating to a plurality of the user's accounts, without having to launch multiple applications on their device to independently access the accounts. Linking user accounts may involve communication between the back-ends associated with the applications. For example, account data of user accounts associated with different applications may be exchanged by the back-end servers of those applications. Reliance on remote intermediaries (such as back-end servers) for linking accounts associated with different applications on a computing device may increase the risk of loss, or otherwise undesired exposure, of user account data.

Various solutions for addressing the aforementioned technical challenges are described in the present disclosure. More particularly, systems and methods for establishing secure communication between applications of a computing device are disclosed, with reference to example embodiments presented below.

FIG. 1 illustrates an exemplary computing environment 100 consistent with certain disclosed embodiments. As shown in FIG. 1, the computing environment 100 may include one or more client devices 110, a resource server 150, a database 151 associated with the resource server 150, a registry 160, and a communications network 120 connecting one or more of the components of computing environment 100.

As illustrated, a resource server 150 (which may also be referred to as a server computer system) and client device 110 communicate via the network 120. In at least some embodiments, the client device 110 is a computing device. The client device 110 may take a variety of forms including, for example, a mobile communication device such as a smartphone, a tablet computer, a wearable computer such as a head-mounted display or smartwatch, a laptop or desktop computer, or a computing device of another type. The client device 110 is associated with a client entity (e.g., an individual, an organization, etc.) having resources that are managed by or via the resource server 150. For example, the resource server 150 may be a financial institution server and the client entity may be a customer of a financial institution operating the financial institution server. The client device 110 may store software instructions that cause the client device to establish communications with the resource server 150 and, in some embodiments, a registry 160 that is external to the client device 110.

The resource server 150 may track, manage, and maintain resources, make lending decisions, and/or lend resources to a client entity associated with the client device 110. The resources may, for example, be computing resources, such as memory or processor cycles. In at least some embodiments, the resources may include stored value, such as fiat currency, which may be represented in a database. For example, the resource server 150 may be coupled to a database 151, which may be provided in secure storage. The secure storage may be provided internally within the resource server 150 or externally. The secure storage may, for example, be provided remotely from the resource server 150. For example, the secure storage may include one or more data centers. The data centers may, for example, store data with bank-grade security.

The database 151 may include data records for a plurality of accounts and at least some of the records may define a quantity of resources associated with the client entity. For example, the client entity may be associated with an account having one or more records in the database 151. The records may reflect a quantity of stored resources that are associated with the client entity. Such resources may include owned resources and, in at least some embodiments, borrowed resources (e.g., resources available on credit). The quantity of resources that are available to or associated with the client entity may be reflected by a balance defined in an associated record such as, for example, a bank balance.

In at least some embodiments, the database 151 may store various types of information in connection with customers of a business entity that administers the resource server 150. For example, the database 151 may store customer profile data and financial account data associated with customers. The customer profile data may include, without limitation, personal information of registered customers, authentication credentials of the customers, account identifying information (e.g., checking account, savings account, revolving credit line, etc.), and information identifying the services (e.g., banking services, investment management services, etc.) and/or programs that are offered to the customers by the business entity. The financial account data may include account balances, historical transaction data, credit score(s), mortgage balances, investment account balances, and portfolio data relating to portfolios of investments that are held by customers, among others.

The business entity associated with the resource server 150 may provide services that are accessible to the client entity. For example, the business entity may provide account management services, financial transaction services, and investment management services for the client entity. In at least some embodiments, the resource server 150 may be configured to provide a user interface that allows client devices 110 to access the services offered by the business entity. By way of example, the resource server 150 may be configured to provide a website or web-based portal which can be accessed via the client devices 110. The website (or portal) may include web content corresponding to various services offered by the business entity, and the resource server 150 may provide the web content for display on the client devices 110. As another example, the resource server 150 may be associated with a software application which may be installed and/or run on the client devices 110.

The computing environment 100 includes a registry 160. In at least some embodiments, the registry 160 may be implemented as a data store (e.g., a database). The registry 160 stores information, settings, options, and other values associated with applications on the client device 110. In particular, the registry 160 stores information that may be used for establishing connections between user accounts associated with different applications. For example, the registry 160 may store, for each of one or more applications on the client device 110, a list of user accounts that are linked to, or are available for linking to, the application. The user accounts may, for example, be associated with other applications or service providers. The registry 160 may also contain account data for the user accounts. For example, the registry 160 may store up-to-date account data which may include user profile information (e.g., name, passwords, contact information, etc.), account settings and preferences, and application identifier, among others. In some embodiments, the registry 160 may indicate accounts that are available for linking to only those applications that are currently on the client device 110.

In at least some embodiments, the registry 160 also stores trusted links data for applications on the client device 110. The trusted links data indicates, for each of one or more applications, at least one unique link that can be used for securely communicating with the application. A trusted link may, for example, be a reference (e.g., address), identifier or any other credential that is associated with an application, such as a uniform resource locator (URL). A trusted link may be associated with a particular application, or it may be associated with a specific in-app location, content, feature, function, etc. of an application. For example, a trusted link may comprise a deep link that points to a specific component within an application.

The registry 160 may maintain trusted links data for applications that are currently available for access on the client device 110. As additional applications are installed (or run) on the client device 110 or application and account data for existing applications are changed, the registry 160 may be updated accordingly.

While FIG. 1 illustrates the registry 160 as a database that is remote from the client device 110, it will be understood that the registry 160 may be implemented in various different forms. In some embodiments, the registry 160 may be implemented internally on the client device 110, for example, as a local data store. The registry 160 may store information for only those applications that are accessible (i.e., installed or run) on the client device 110. In some embodiments, the registry 160 may be incorporated into a registry device (e.g., a registry server) that is remote from the client device 110. A registry device, or server, may be configured to process requests to obtain linked accounts and/or trusted links data from various computing devices. In particular, the registry device/server may process such requests based on data that is stored in the registry 160.

The client device 110, the resource server 150 and the registry 160 may be in geographically disparate locations. Put differently, the client device 110 may be remote from one or both of the resource server 150 and the registry 160. As described above, the client device 110, the resource server 150 and the registry 160 may be computer systems.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2A:
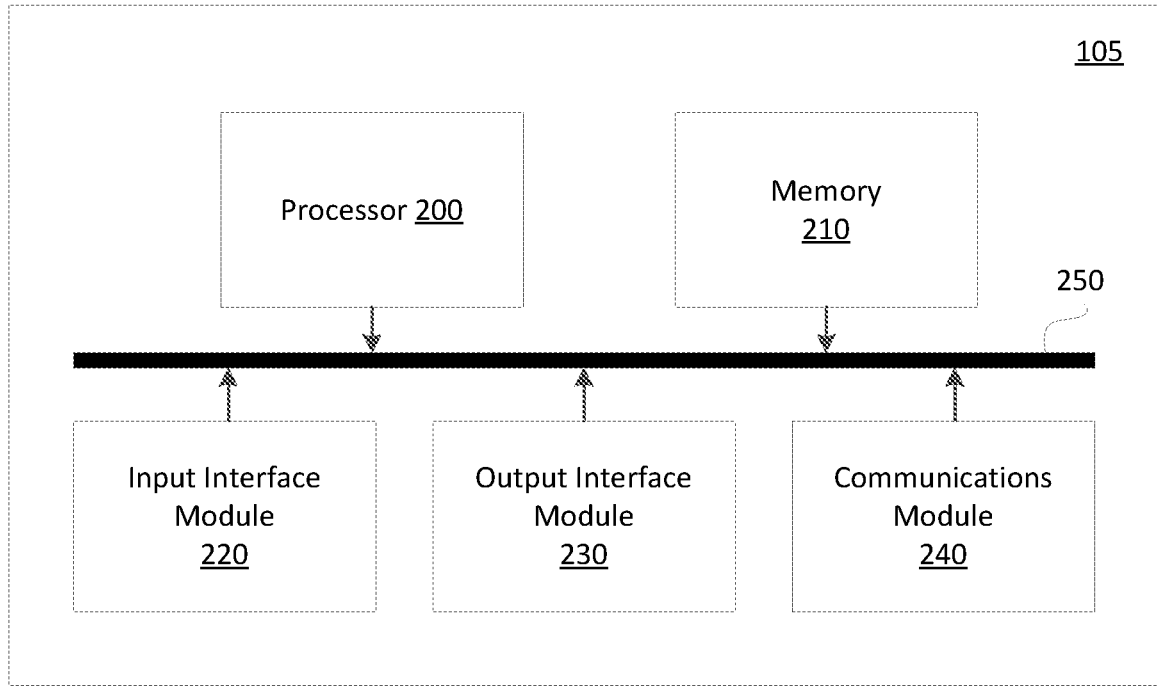
FIG. 2A is high-level schematic diagram of an example computing device.

FIG. 2A is a high-level operation diagram of an example computing device 105. In some embodiments, the example computing device 105 may be exemplary of one or more of the client devices 110, the resource server 150 and the registry 160. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
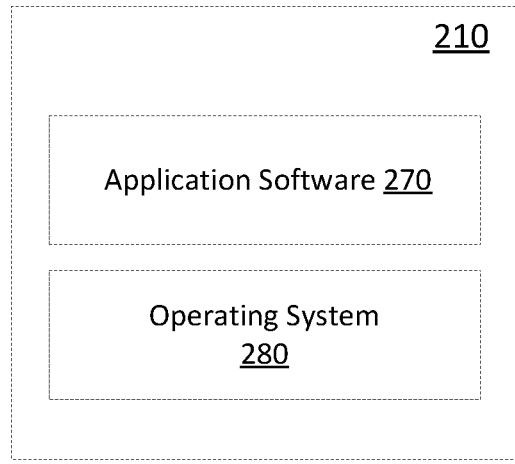
FIG. 2B shows a simplified organization of software components stored in a memory of the example computing device of FIG. 2A.

FIG. 2B depicts a simplified organization of software components stored in memory 210 of the example computing device 105. As illustrated, these software components include an operating system 280 and application software 270.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

The application software 270 adapts the example computing device 105, in combination with the operating system 280, to operate as a device performing a particular function. For example, the application software 270 may cooperate with the operating system 280 to adapt a suitable embodiment of the example computing device 105 to operate as the client device 110, the resource server 150, or the registry 160.

While a single application software 270 is illustrated in FIG. 2B, in operation, the memory 210 may include more than one application software 270 and different application software 270 may perform different operations.

Figure 3:
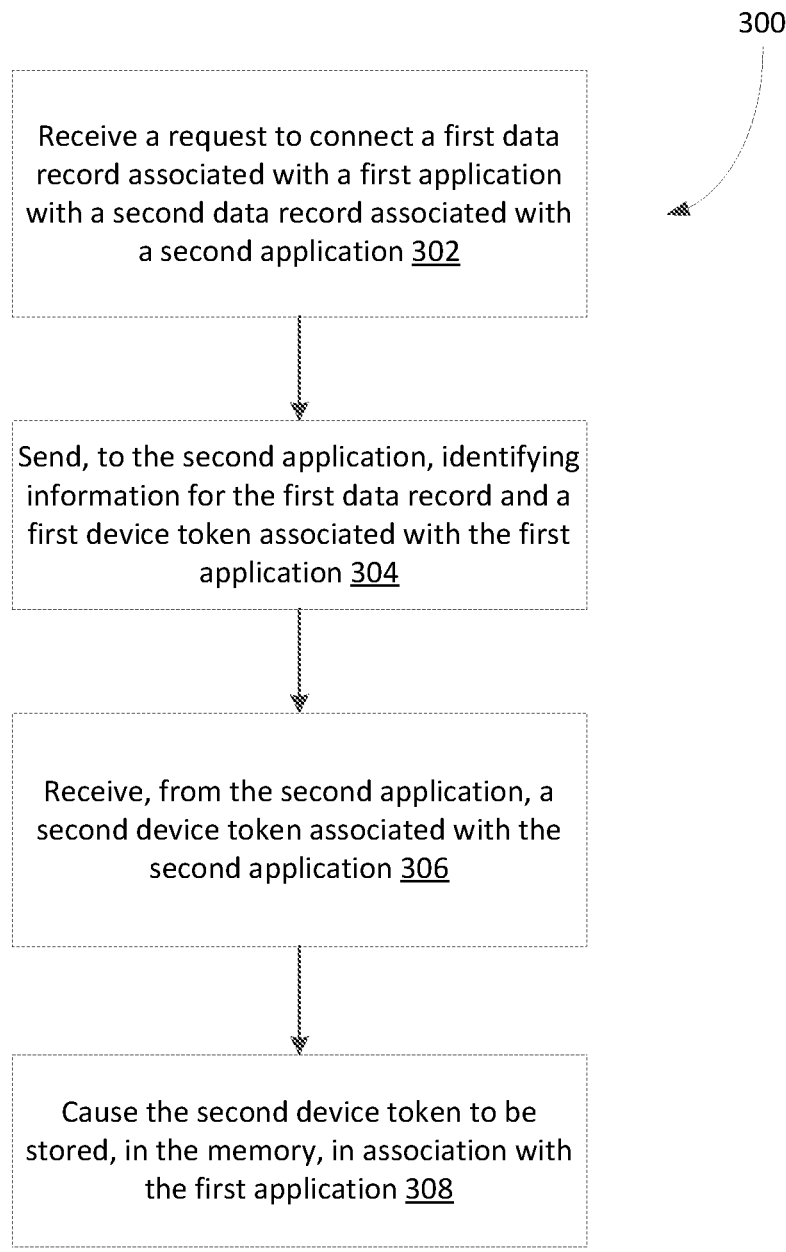
FIG. 3 shows, in flowchart form, an example method for establishing a secure communication channel between applications on a computing device.

Reference is now made to FIG. 3 which shows, in flowchart form, an example method 300 for establishing a secure communication channel between applications on a computing device. The method 300 may be implemented, in whole or in part, by a back-end computing system associated with an application on the computing device, such as the resource server 150 of FIG. 1. In some embodiments, the method 300 may be implemented in conjunction with the computing device and a registry service, such as the registry 160 of FIG. 1.

The operations of method 300 may be performed for linking a user account associated with a first application on a computing device and a user account associated with a second, different application on the computing device. As will be explained in greater detail below, the method 300 may allow a linking of accounts associated with different applications on a computing device to be conducted via on-device, inter-application communication. More specifically, the accounts may be linked to each other without engaging intermediaries that are remote from the computing device.

Operations 302 and onward may be performed by one or more processors of a computing device such as, for example, the processor 200 (FIG. 2A) of suitably configured instances of the example computing device 105 (FIG. 2A).

In operation 302, the computing system (associated with a first application on the computing device) receives a request to connect a first data record associated with the first application with a second data record associated with a second application. The request may include identifying information for the second data record and/or the second application (e.g., application ID). The request may be received via a front-end associated with the first application. For example, a user of the computing device may input, via a graphical user interface of the first application, a request to connect (or link) a first data record associated with a user account for the first application with a second data record associated with a user account for the second application. The first and second data records may be maintained locally by the first and second applications, respectively, in connection with user accounts associated with the respective applications. In particular, account data associated with the data records (and corresponding user accounts) may be stored locally on the computing device.

In some embodiments, the request may indicate identities of the first and second applications, without identifying specific data records (or user accounts) associated with those applications. For example, a user of the computing device may input selection or identifying information of a first application and a second application, and request to connect user accounts that are associated with the applications. In such cases, the computing system may identify a first default user account associated with the first application and a second default user account associated with the second application. The request to connect the user accounts may be processed by linking the first and second default user accounts, in accordance with method 300.

Subsequent to receiving the request to link the accounts, a secure communication channel is established between the first application and the second application. The communication channel enables transmission of data between the first and second applications. More specifically, the communication channel may be used by the applications to securely exchange information for linking the first and second data records associated with the respective applications. The communication channel, once established, represents a secure link between the first and second data records. In particular, the applications may exchange record- (or account-) specific data and/or invoke particular functions implemented by the other of the applications via the communication channel.

In operation 304, the computing system sends, to the second application, a request for linking the first data record with a second data record associated with the second application. The request may include a message comprising, at least, identifying information for the first data record and a first device token associated with the first application. The identifying information for the first data record may include, for example, account data (e.g., name, contact information, etc.) for a user account associated with the first application, information identifying a specific data record associated with the user account, and an application identifier for the first application.

In at least some embodiments, the first device token may represent a push token associated with the first application. In particular, the first device token may be a key (or another identifier), unique to the first application, that is used for creating a connection to other applications on the computing device. The first device token contains information identifying the first application. In some embodiments, the first device token may comprise a unique signature associated with the first application. That is, the first device token may be signed (for example, using one or more cryptographic keys) prior to transmitting to the second application.

The message to the second application in operation 304 is provided "on-device". That is, the message is sent to the second application locally on the computing device, without passing the message to an intermediary (e.g., a remote server) that is remote from the computing device. For example, the message may be provided to an OS-level notification service on the computing device which, in turn, may forward the message to the second application. Alternatively, the message may be provided directly to the second application. For example, as will be described with reference to FIG. 4, the first application may use a trusted link (e.g., a deep link) associated with the second application to send, to the second application, a request for connecting user accounts associated with the respective applications.

In some embodiments, the message payload of the message that is sent in operation 304 may be encrypted. In particular, one or both of the identifying information for the first data record and the first device token may be provided to the second application in an encrypted format.

In operation 306, the computing system receives, from the second application, a second device token associated with the second application. The second device token may, in some embodiments, represent a push token associated with the second application. For example, the second device token may be a key (or another identifier) that is unique to the second application. In this way, the first and second applications exchange tokens (e.g., push tokens) that can be used for establishing a secure connection, such as a communication channel, between the applications.

In operation 308, the computing system causes the second device token to be stored, in the memory, in association with the first application. For example, the second device token may be saved in a registry (or another database) that is local to or remote from the computing device. The second device token is stored in association with the first application. More generally, the tokens that are used for establishing connections to a user account of an application may be stored in association with the application. For example, the first device token may be stored, in memory, in association with the second application. The stored tokens may be retrieved from memory, as required, in order for applications to exchange messages securely on the computing device.

Figure 4:
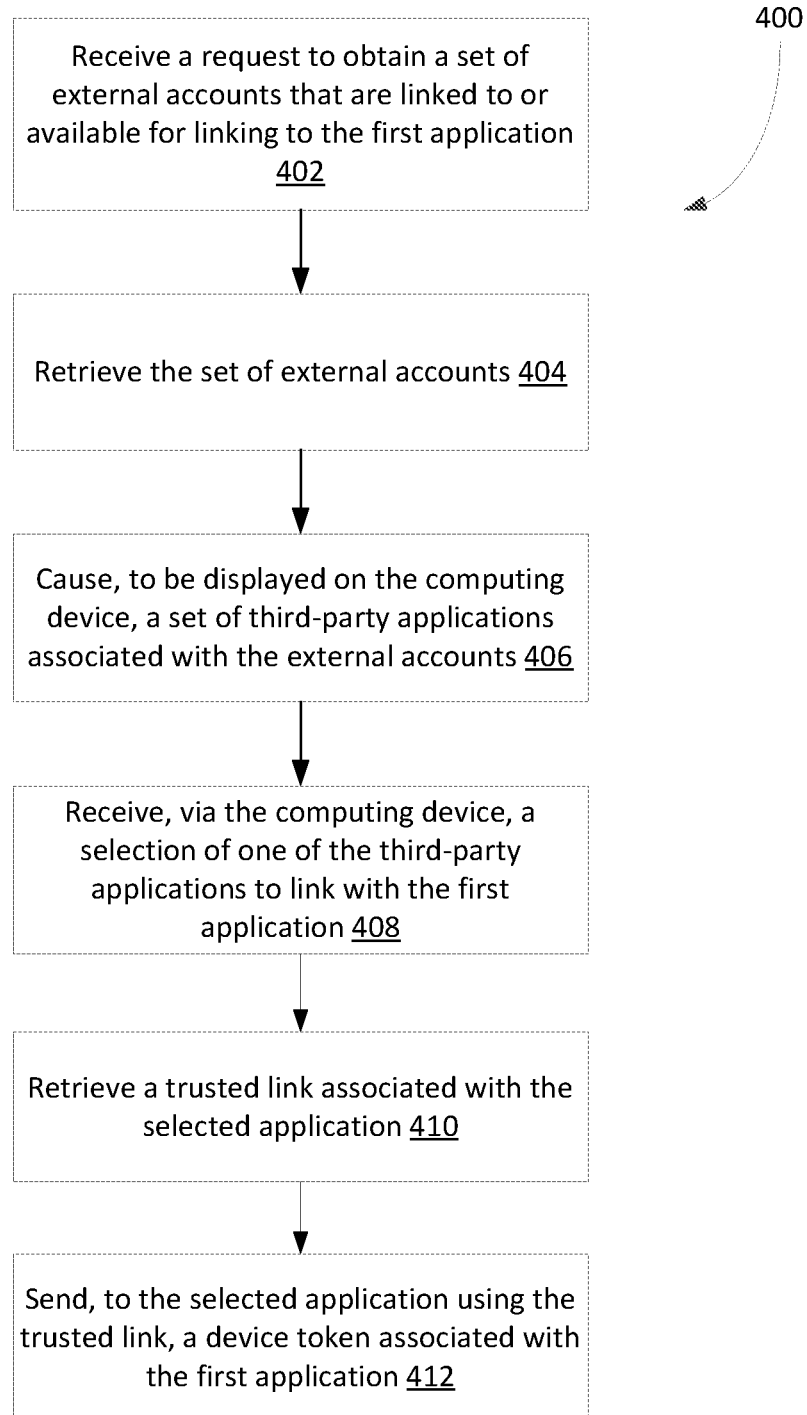
FIG. 4 shows, in flowchart form, another example method for establishing a secure communication channel between applications on a computing device.

Reference is now made to FIG. 4 which shows, in flowchart form, another example method 400 for establishing a secure communication channel between applications on a computing device. The method 400 may be implemented, in whole or in part, by a back-end computing system associated with an application on the computing device, such as the resource server 150 of FIG. 1. In some embodiments, the method 400 may be implemented in conjunction with the computing device and a registry service, such as the registry 160 of FIG. 1

The operations of method 400 may be performed for linking a user account associated with a first application on a computing device and a user account associated with a second, different application on the computing device. In particular, the method 400 may allow a linking of accounts associated with different applications on a computing device to be conducted via on-device, inter-application communication.

Operations 402 and onward may be performed by one or more processors of a computing device such as, for example, the processor 200 (FIG. 2A) of suitably configured instances of the example computing device 105 (FIG. 2A). The operations of method 400 may be performed in addition to, or as alternatives of, one or more of the operations of method 300.

In operation 402, the computing system (associated with a first application on the computing device) receives a request to obtain a set of external accounts that are linked to or are available for linking to the first application. For example, a user of the computing device may launch the first application and input a request to retrieve a set of external accounts that can be linked to the first application. The set of external accounts may comprise user accounts that are associated with other applications on the computing device. More generally, the set of external accounts may be associated with third-party providers (e.g., applications, service providers, etc.) of user accounts that support linking of accounts with the first application.

In operation 404, the computing system retrieves the requested set of external accounts. In particular, the computing system may obtain a list (or another indication) of user accounts that are either linked to the first application or are available for linking with the first application. In some embodiments, the list of user accounts may be obtained from a data store, such as a local or remote registry, that stores account data of user accounts that are associated with third-party providers. The data store may, for example, contain information associated with third-party providers that support linking of user accounts with the first application. Additionally, or alternatively, the data store may indicate, for each of one or more applications, a set of linked accounts. For example, the data store may contain a listing of user accounts that are linked to one or more of the applications on the computing device.

In operation 406, the computing system causes an indication of a set of third-party applications associated with the external accounts to be displayed on the computing device. After receiving the list of third-party providers that support linking with the first application, the computing system may cause a listing of such providers (e.g., applications) to be displayed on the computing device. For example, information relating to the applications associated with the user accounts that are available for linking to the first application may be displayed in a graphical user interface of the first application.

In operation 408, the computing system receives a selection of one of the third-party applications to link with the first application. The selection represents an indication of an application on the computing device (and/or a user account associated with the application) that is desired to be linked with the first application. The selection may indicate only the identity of the application to link with the first application, or it may additionally indicate a specific user account associated with the application for linking with the first application.

In operation 410, the computing system retrieves a trusted link associated with the selected third-party application. In at least some embodiments, the trusted link is unique to the selected application. The trusted link may, for example, comprise a deep link that is associated with the selected application or an in-app component (e.g., location, feature, function, etc.) of the selected application. The computing system may retrieve the trusted link associated with the selected application from a data store, such as a registry, that is local to or remote from the computing device. In some embodiments, authentication may be required to access the trusted link information at the data store. For example, the identity of the requesting user may be required to be verified before access to trusted link data associated with the selected application is granted. The trusted link may, in some embodiments, be signed, for example, by a registry service that stores the trusted link. The signature may be used for verifying authenticity of the trusted link before applications attempt to establish communication connections using the trusted link. For example, an application may request a registry service to verify a trusted link that is provided by another application for the purpose of connecting/communicating with the application.

In operation 412, the computing system sends, to the selected application using the trusted link, a device token (e.g., a push token) that is associated with the first application. In particular, the trusted link is used to pass a device token to the selected application. For example, a message that comprises a device token of the first application and the trusted link may be sent to the selected application. The device token may, in some embodiments, be signed prior to transmission to the selected application.

A trusted link associated with an application may allow any communication with the application, or it may define limits and/or specific types of permitted communications. For example, a trusted link may define one or more specific operations or purposes for which communication with the application is permitted, and the trusted link may then be validly used only for those defined operations/purposes. When data, such as application data or command, is transmitted to an application using a trusted link, the communication may be assessed to determine whether the transmitted data is covered by definition of permitted operations/purposes for the trusted link.

The device token is provided to the selected application on-device, without engaging an intermediary, such as an application back-end server, that is remote from the computing device. That is, the device token is transmitted without exchanging communication with an external intermediary. Additionally, or alternatively, the computing system may send, to the selected application, an identifier (e.g., email address) of a user account associated with the first application. The device token and/or the account identifier may be included in a message that is sent using the trusted link. The data that is provided to the selected application may, in some embodiments, be provided in an encrypted format.

The linking of applications on a computing device and more specifically, the linking of user accounts associated with the applications as described in example methods 300 and 400 may allow the applications to communicate in a secure manner. In particular, a secure communication channel between applications of a computing device may be established. Applications may exchange data, such as application and user account data, and invoke specific operations that are implemented by other linked applications using the established communication channel. The communication channel allows applications to securely communicate on-device, and removes the need to pass any inter-application communication through intermediaries (e.g., application back-end servers) that are remote from the computing device.

Figure 5:
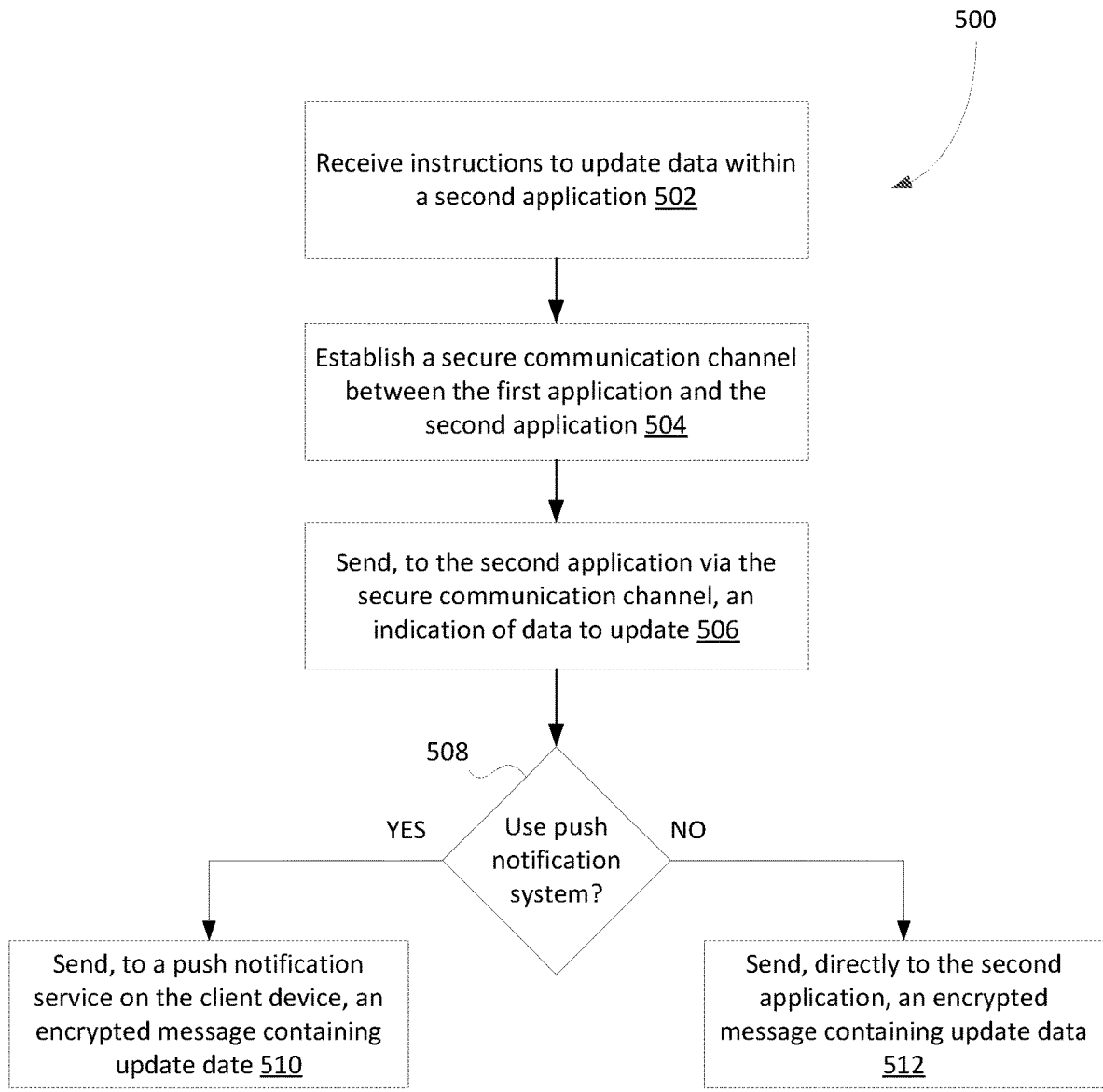
FIG. 5 shows, in flowchart form, an example method for requesting an application to update its application data via a secure communication channel.

Example uses of a secure communication channel between applications are described with reference to FIGS. 5 and 6. FIG. 5 shows, in flowchart form, an example method 500 for requesting an application to update its application data via a secure communication channel. The method 500 may be implemented, in whole or in part, by a back-end computing system associated with an application, such as the resource server 150 of FIG. 1. In some embodiments, the method 500 may be implemented in conjunction with the computing device and a registry service, such as the registry 160 of FIG. 1

Operations 502 and onward may be performed by one or more processors of a computing device such as, for example, the processor 200 (FIG. 2A) of suitably configured instances of the example computing device 105 (FIG. 2A). The operations of method 500 may be performed in addition to, or as alternatives of, one or more of the operations of methods 300 and 400.

In operation 502, the computing system associated with a first application receives instructions to add or update data within a second application. More specifically, the computing system may receive user input identifying a second, linked application and specific data to add or update for the second application. By way of example, the user input may comprise a request to add card data of a value transfer card for use with a second application (e.g., a mobile wallet application). The value transfer card may be represented, for example, as a primary account number (PAN) or it may be a tokenized value transfer card.

In operation 504, a secure communication channel is established between the first application and the second application. The communication channel may be established in a manner that is similar to any of the techniques described with reference to methods 300 and 400. For example, the communication channel between the application may be established through the use of trusted links and exchange of push tokens associated with the respective applications, as described above.

In operation 506, the computing system sends, to the second application via the secure communication channel, an indication of data to add/update. In the example of adding a value transfer card, the computing system may send card data associated with a specific value transfer card to the second application using the secure communication channel. The card data may, for example, be included in account data of a user account associated with the first application. Upon receiving user selection of a value transfer card, the computing system may retrieve the card data for the selected card and send the card data to the second application. In particular, account data of a user account associated with the first application is provided to a linked application, via the secure communication channel, with instructions to add (or link, or otherwise save) the account data to the linked application. In some embodiments, the computing system may save in memory (e.g., local or remote data store) an indication that the value transfer card is linked or added to the second application.

The on-device communication between applications via the secure communication channel may be conducted in various ways. In some embodiments, an operating system (OS)-level notification service may be engaged to send data between the linked applications. If the computing system determines that an OS-level notification service is to be used (operation 508), a message containing the add/update data for the second application may be sent to the notification service, in operation 510. For example, an OS-level push notification service may be engaged to transmit a message containing update data for the second application. In the abovementioned example of value transfer cards, the message transmitted via the secure communication channel may include a payload that contains, at least, a device (e.g., push) token for the second application, an indication of an event type (e.g., account link event), and a representation of the value transfer card (or card data). The payload of the message, or parts thereof, may be encrypted prior to transmission.

If, on the other hand, a notification service is not engaged, the message containing the update data may be sent directly to the second application, in operation 512. In some embodiments, a trusted link associated with the second application may be used for transmitting the message to the second application. In the example of value transfer cards, the computing system may transmit, to the second application, a message whose payload contains a device token for the second application, an indication of an event type, and a representation of the value transfer card, and the message may be sent with a trusted link associated with the second application. The payload of the message, as well as the trusted link, may be encrypted prior to transmission.

Figure 6:
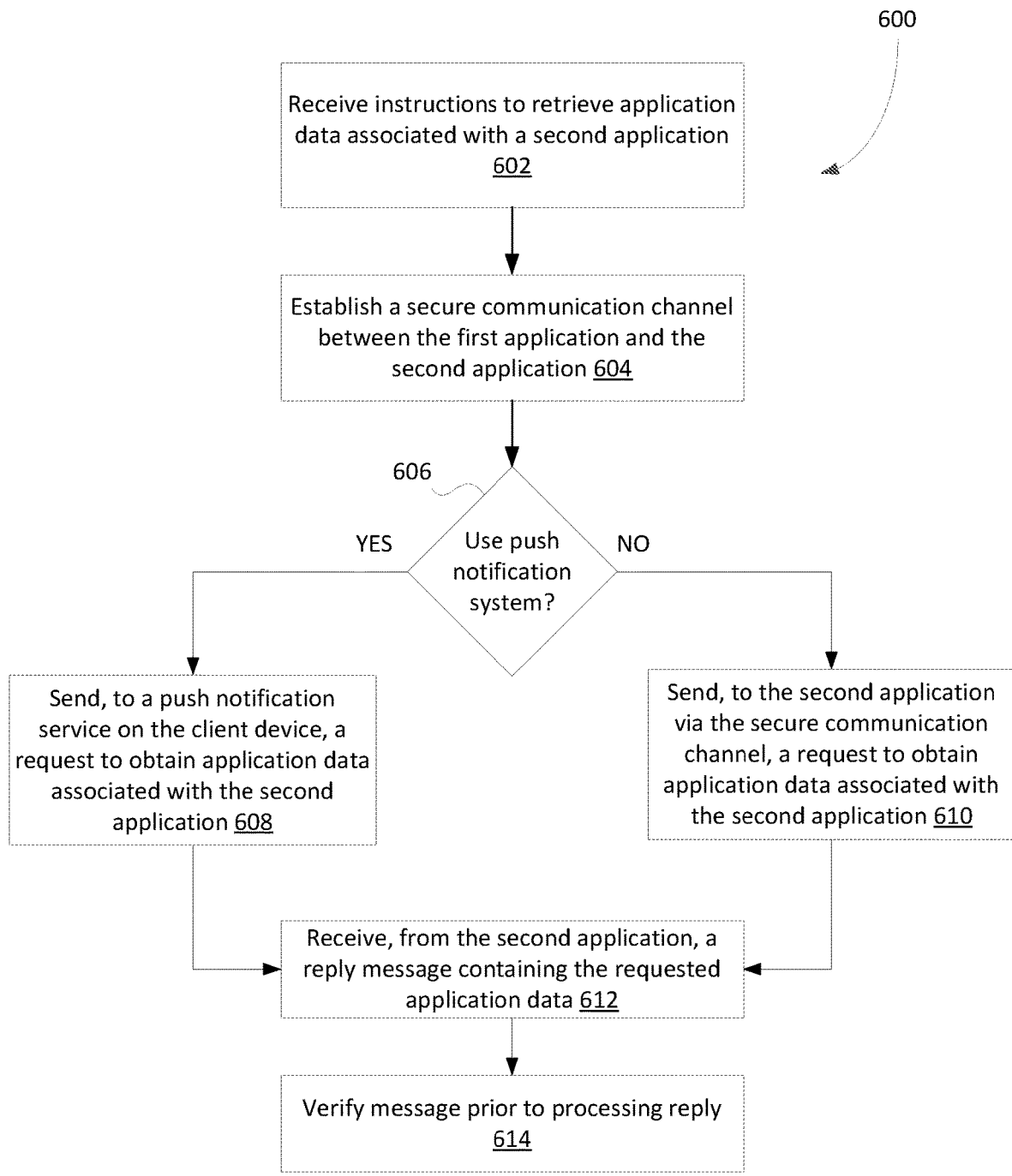
FIG. 6 shows, in flowchart form, an example method for obtaining application data via a secure communication channel.

Reference is now made to FIG. 6 which shows, in flowchart form, an example method 600 for obtaining application data via a secure communication channel. The method 600 may be implemented, in whole or in part, by a back-end computing system associated with an application, such as the resource server 150 of FIG. 1. In some embodiments, the method 600 may be implemented in conjunction with the computing device and a registry service, such as the registry 160 of FIG. 1

Operations 602 and onward may be performed by one or more processors of a computing device such as, for example, the processor 200 (FIG. 2A) of suitably configured instances of the example computing device 105 (FIG. 2A). The operations of method 600 may be performed in addition to, or as alternatives of, one or more of the operations of methods 300, 400 and 500.

In operation 602, the computing system associated with a first application on the computing device receives instructions to retrieve application data associated with a second application. More specifically, the computing system may receive user input identifying a second, linked application and specific data (e.g., application data, such as account data of a user account, etc.) associated with the second application to retrieve. By way of example, the user input may comprise a request to retrieve account data for a user account that is associated with the second application (e.g., a banking application). The account data may, for example, include one or more values (e.g., bank account balance, etc.) associated with the user account.

In operation 604, a secure communication channel is established between the first application and the second application. The communication channel may be established in a manner that is similar to any of the techniques described with reference to methods 300 and 400. For example, the communication channel may be established through the use of trusted links and exchange of push tokens associated with the respective applications.

If the computing system determines that an OS-level notification service is to be used for requesting to obtain application data from the second application (operation 606), a request to obtain the application data may be sent to the notification service, in operation 608. For example, an OS-level push notification service may be engaged to transmit a message identifying specific application data (e.g., user account data) to retrieve from the second application. The message payload of the message may, in some embodiments, be encrypted.

If, on the other hand, a notification service is not engaged for transmitting the request to the second application, the message containing the data retrieval request may be sent directly to the second application, in operation 610. In some embodiments, a trusted link associated with the second application may be used for transmitting the data retrieval request to the second application. In particular, the request may be transmitted via a secure communication channel between the first and second applications. For example, the computing system may transmit, to the second application, a message whose payload identifies specific application data to retrieve from the second application, and the message may be sent with a trusted link associated with the second application.

In operation 612, the computing system receives, from the second application via the secure communication channel, a reply message. If the data retrieval operation for the second operation is successful, the reply message may contain the requested application data (e.g., one or more values associated with a user account). If, on the other hand, the data retrieval operation is not successful (e.g., request to retrieve data is rejected), the reply message may include an indication of the failure and reasons therefor. In operation 614, the computing system may verify the reply message prior to processing the reply. In particular, the computing system may check the authenticity of the reply message by determining whether it originated from the second application.

Figure 7:
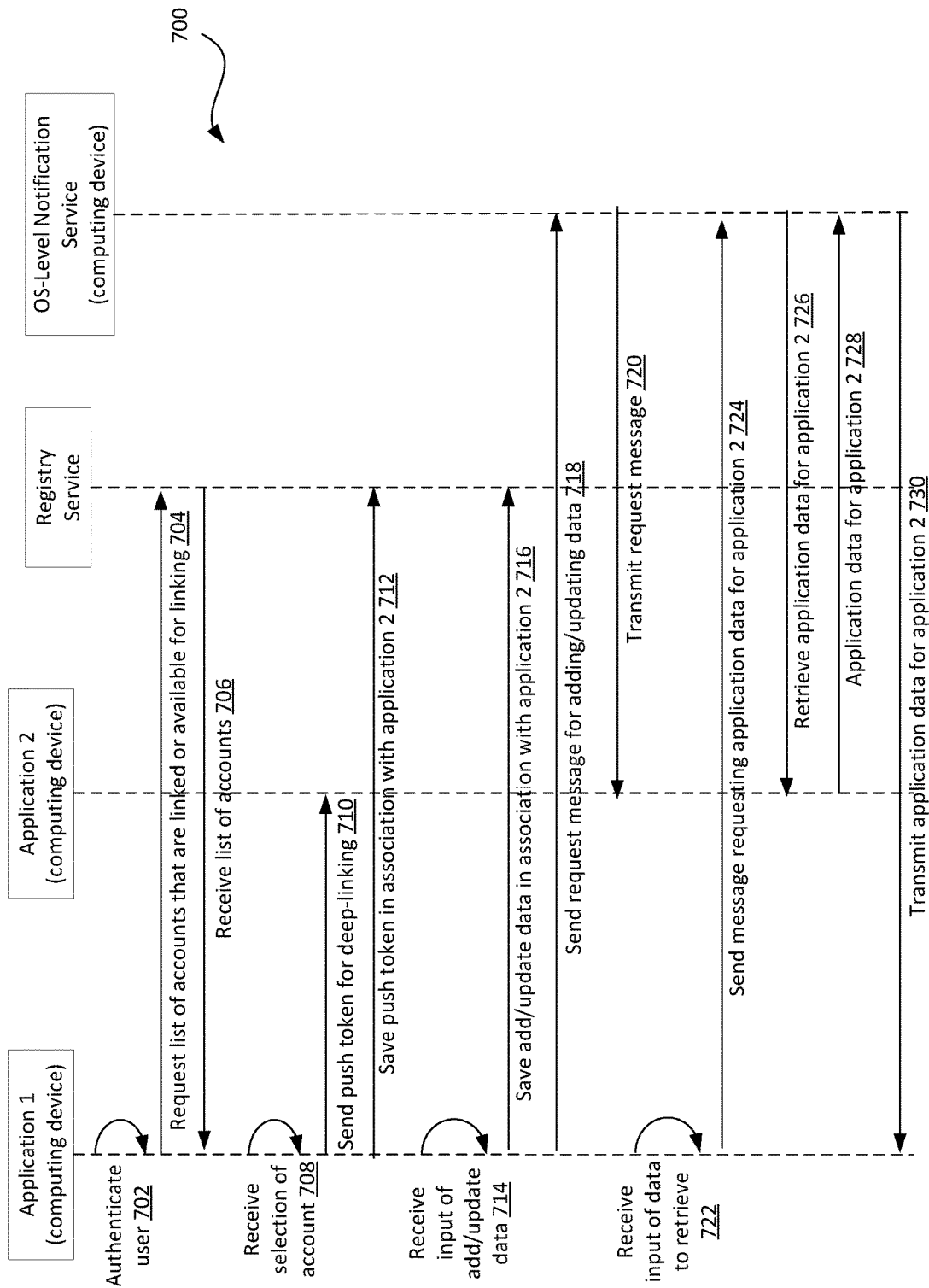
FIG. 7 is a sequence diagram showing an example set of operations for establishing a secure communication channel between applications on a computing device.

Reference is now made to FIG. 7 which is a sequence diagram showing an example set 700 of operations for establishing a secure communication channel between applications on a computing device. The operations of set 700 may be implemented as part of a protocol for linking user accounts that are respectively associated with a first application ("Application 1") and a second application ("Application 2") on the same device. It will be understood that the operations of set 700 may also be applicable in the case of applications that are resident on different devices (e.g., multiple devices that are associated with a same user).

When an end-user launches Application 1 on a computing device, the Application 1 may initiate authentication of the end-user, in operation 702. For example, the end-user may be prompted to log in to a user account associated with Application 1, and the end-user may input authentication credentials (e.g., user name and password) in order to begin an authenticated session within Application 1.

Once the end-user is authenticated, the end-user may initiate a process for linking the user account associated with Application 1 with one or more user accounts associated with different applications. In some embodiments, the end-user inputs a request to obtain a list of accounts that are either linked to Application 1 or are available for linking to Application 1, in operation 704. The request may be forward to a registry service, or a computing system implementing a registry service, that stores account information for a plurality of third-party account providers, such as third-party applications. The list of accounts may include, for example, a set of external user accounts that can be connected to Application 1 and/or the user account associated with Application 1. The list of accounts may also include trusted links data indicating unique trusted links associated with the applications/accounts. That is, the returned list may indicate user accounts available for linking and trusted links for the applications associated with those accounts.

The requested list of accounts is forwarded to Application 1, in operation 706, and may be presented, for example, in a graphical user interface of Application 1 on the computing device. In operation 708, the end-user inputs selection (Application 2) of one of the accounts included in the list of account returned in operation 706. For example, the selection of the end-user may indicate a user account associated with Application 2 or simply indicate Application 2.

In operation 710, a push token (or another unique identifier) associated with Application 1 is sent to Application 2, i.e., the selected application. The push token may be used to establish a secure communication channel between Application 1 and Application 2. In particular, the push token may be used for deep-linking from Application 1 to Application 2 (or a specific component of Application 2). The push token may be sent directly to Application 2 from Application 1, or via a third-party service such as an OS-level notification service that is accessible on the computing device. In this way, Application 1 and Application 2 exchange push tokens that can be saved (operation 712) and used for on-device, inter-application communication. The push tokens may be saved, for example, in a local or remote data store, such as a data store provided by a registry service.

Operations associated with example uses of the secure communication channel are illustrated in FIG. 7.

In a first example, the end-user may input, via Application 1, an indication of data to add or update for Application 2, in operation 714. The add/update data for Application 2 may be saved in association with Application 2, for example, at a registry service, in operation 716. Application 1 sends, to an OS-level notification service on the computing device, a message requesting the user-identified add/update operation to Application 2, in operation 718. The request message may identify a type of the request (e.g., account link event) for the notification service. The request message is sent on-device, without an intermediary that is remote from the computing device. The request message may include a payload containing specific data to add or update, and the payload may be encrypted prior to transmission.

The OS-level notification service, in turn, forwards the request message to Application 2, in operation 720. The request message includes, at least, a previously exchanged push token associated with Application 2 that is used for establishing a secure communication channel or link between Application 1 and Application 2. Upon receiving and validating the request message, Application 2 may perform the requested add/update.

In a second example, the end-user may input, via Application 1, an indication of data to retrieve from Application 2. The requested data may comprise, for example, application data, user account data, and the like. Upon receiving the data retrieval request in operation 722, a message requesting data associated with Application 2 may be transmitted to Application 2 (operation 724). The request message may, for example, be transmitted to an OS-level notification service which, in turn, forwards the message to Application 2 (operation 726). Upon receiving and validating the request message, Application 2 provides a reply message that either includes the requested application data (e.g., user account data) or an indication that the data retrieval was not successful, in operation 728. The OS-level notification system forwards the reply message to Application 1, in operation 730.

Figure 8:
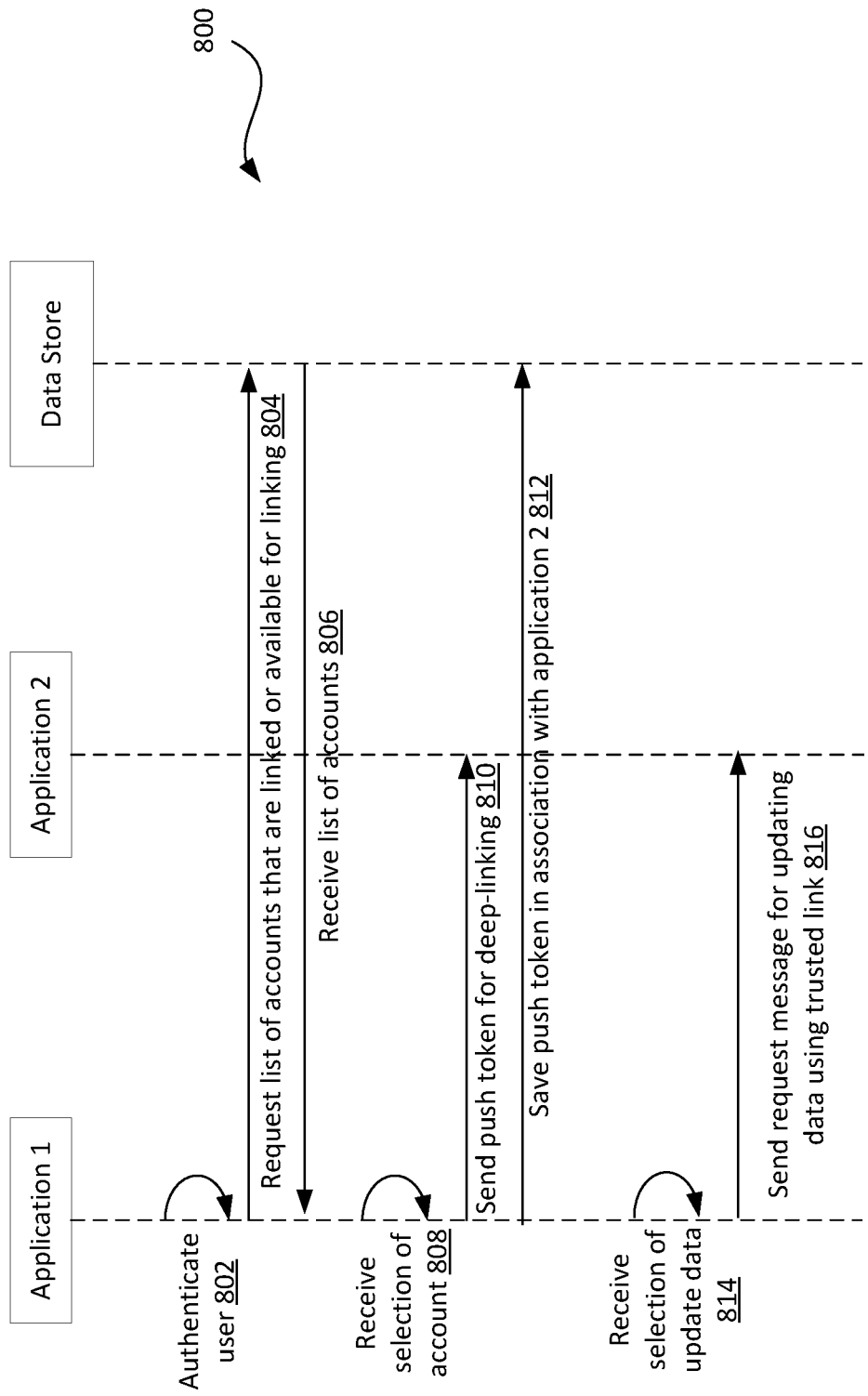
FIG. 8 is a sequence diagram showing another example set of operations for establishing a secure communication channel between applications on a computing device.

Reference is now made to FIG. 8 which is a sequence diagram showing an example set 800 of operations for establishing a secure communication channel between applications on a computing device. The operations of set 800 may be implemented as part of a protocol for linking user accounts that are respectively associated with a first application ("Application 1") and a second application ("Application 2") on the same device.

While the example operations illustrated in FIG. 7 access a third-party messaging service (i.e., OS-level notification service), it will be understood that secure on-device communication between applications of a computing device may be effected without an intermediary on-device service. In particular, as shown in FIG. 8, messages can be exchanged by applications (Application 1 and Application 2) using trusted links for establishing a secure communication channel between the applications.

Operations 802 to 812 correspond to operations 702 to 712 of FIG. 7 and can be performed in a similar manner as those operations. Once the trusted link for Application 2 is obtained, Application 1 can establish a secure connection with Application 2 for on-device communication. The trusted links can be used when passing messages between Application 1 and Application 2, and an intermediary service may be omitted. By way of example, user selection of data (e.g., new value transfer card) to add/update for Application 2 may be received via Application 1, in operation 814. A request message indicating the requested change to Application 2 can be transmitted directly to Application 2 using a trusted link associated with Application 2 (operation 816).

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing device, comprising:
  a processor; and
  a memory coupled to the processor, the memory storing processor-executable instructions that, when executed by the processor, are to cause the processor to:
    receive, via a first application, a request to connect a first data record associated with the first application on the computing device with a second data record associated with a second application on the computing device;
    establish a secure data communication channel between the first application and the second application, wherein establishing the secure data communication channel comprises:

sending, by the first application to the second application, identifying information for the first data record and a first device token associated with the first application, wherein the sending to the second application includes:
- retrieving, from a data store, a trusted link associated with the second application; and
- sending, to the second application, the identifying information for the first data record and the first device token using the trusted link;

receiving, by the first application from the second application, a second device token associated with the second application; and causing the first device token and the second device token to be stored, in the memory, in association with the second application and the first application, respectively;

receive, via the first application, a request for transfer of data between the first application and the second application; and in response to receiving the request, transmit, by the first application to the second application via the secure data communication channel, a message comprising the second device token using the trusted link associated with the second application.

2. The computing device of claim 1, wherein the first device token comprises a unique signature associated with the first application.

3. The computing device of claim 1, wherein the instructions, when executed, are to further cause the processor to:
receive a request to add or update a value transfer card for use with the second application; and
in response to receiving the request to add or update the value transfer card, send, to the second application via the secure data communication channel, card data of the value transfer card.

4. The computing device of claim 3, wherein a message payload of the message contains the second device token, an indication of an event type, and a representation of the value transfer card.

5. The computing device of claim 4, wherein the message payload of the message is encrypted.

6. The computing device of claim 1, wherein the trusted link is associated with one or more permitted operations and wherein the instructions, when executed, are to further cause the processor to determine whether transmitted data s covered by the one or more permitted operations.

7. The computing device of claim 1, wherein the instructions, when executed, are to further cause the processor to:
receive a request to retrieve first data from the second application; and
in response to receiving the request to retrieve the first data from the second application, transmit, by the first application to the second application via the secure data communication channel, a data retrieval request message.

8. The computing device of claim 7, wherein the instructions, when executed, are to further cause the processor to receive, from the second application via the secure data communication channel, a reply message containing at least the requested first data.

9. A processor-implemented method, comprising:
receiving, via a first application, a request to connect a first data record associated with the first application on a computing device with a second data record associated with a second application on the computing device;

establishing a secure data communication channel between the first application and the second application, wherein establishing the secure data communication channel comprises:
sending, by the first application to the second application, identifying information for the first data record and a first device token associated with the first application, wherein the sending to the second application includes:
- retrieving, from a data store, a trusted link associated with the second application; and
- sending, to the second application, the identifying information for the first data record and the first device token using the trusted link;

receiving, by the first application from the second application, a second device token associated with the second application; and causing the first device token and the second device token to be stored, in the memory, in association with the second application and the first application, respectively;

receiving, via the first application, a request for transfer of data between the first application and the second application; and in response to receiving the request, transmit, by the first application to the second application via the secure data communication channel, a message comprising the second device token using a trusted link associated with the second application.

10. The method of claim 9, wherein the first device token comprises a unique signature associated with the first application.

11. The method of claim 9, further comprising:
receiving a request to add a value transfer card for use with the second application; and
in response to receiving the request to add the value transfer card, sending, to the second application via the secure communication channel, card data of the value transfer card.

12. The method of claim 9, wherein a message payload of the message contains the second device token, an indication of an event type, and a representation of the value transfer card.

13. The method of claim 12, wherein the message payload of the message is encrypted.

14. The method of claim 9, wherein the trusted link is associated with one or more permitted operations and wherein the instructions, when executed, are to further cause the processor to determine whether transmitted data s covered by the one or more permitted operations.

15. The method of claim 9, further comprising:
receiving a request to retrieve first data from the second application; and
in response to receiving the request to retrieve the first data from the second application, transmitting, by the first application to the second application via the secure data communication channel, a data retrieval request message.

16. The method of claim 15, further comprising receiving, from the second application via the secure data communication channel, a reply message containing at least the requested first data.

* * * * *